United States Patent
Murai et al.

(10) Patent No.: US 6,203,205 B1
(45) Date of Patent: Mar. 20, 2001

(54) CYLINDRICAL ROLLER BEARING

(75) Inventors: Takashi Murai; Takashi Yamamoto; Shinichi Tsunashima, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/351,327

(22) Filed: Jul. 12, 1999

(30) Foreign Application Priority Data

Jul. 10, 1998 (JP) .................................................. 10-195890

(51) Int. Cl.[7] ............................ F16C 33/46; F16C 33/38; F16C 33/66
(52) U.S. Cl. ........................ 384/450; 384/470; 384/523; 384/572
(58) Field of Search ........................... 384/470, 523–534, 384/572–580, 450

(56) References Cited

U.S. PATENT DOCUMENTS 5,716,146 * 2/1998 Murai et al. ......................... 384/450

FOREIGN PATENT DOCUMENTS 3-67718    7/1991 (JP) .

* cited by examiner

Primary Examiner—Thomas R. Hannon
(74) Attorney, Agent, or Firm—Sughrue, Mion, Zinn, Macpeak & Seas, PLLC (57) ABSTRACT

A cylindrical roller bearing comprises an inner race, an outer race, a plurality of cylindrical rollers disposed between the inner race and the outer race, and a cage disposed between the inner race and the outer race and provided with pocket portions in which the plurality of cylindrical rollers are respectively accommodated. The cylindrical roller bearing satisfies a following relations

$$1.5 \times 10^{-3} D \leq H \leq 9.0 \times 10^{-3} D$$

and

$$A/B = 0.6 \sim 1.0$$

where D is a diameter of a cage circumferential surface of the cage which is either one of inner and outer circumferential surfaces of an axial end portion of the cage, H is a size of an annular clearance between the cage circumferential surface and a race circumferential surface which is either one of an outer race rib inner-diameter surface and an inner race rib outer-diameter surface opposite to the cage circumferential surface, A is an axial length of the cage circumferential surface and B is an axial length of the race circumferential surface. The bearing using a system for guiding the cage a roller guide system in which radial displacement of the cage is limited by engagement between each pocket and a corresponding roller. A roller guide surface of the cage is provided in a portion opposite to a linear-form portion at least except crowning portions in an axial direction of a roller rolling surface.

7 Claims, 6 Drawing Sheets

OUTER RACE

INNER RACE

FIG.8

OUTER RACE

INNER RACE

POCKET P.C.D
ROLLER P.C.D

CYLINDRICAL ROLLER BEARING

BACKGROUND OF THE INVENTION

The present invention relates to a cylindrical roller bearing incorporated in a general machine such as a middle-size electric motor, a large-size electric motor, or the like, and particularly to a cylindrical roller bearing in need of low vibration and low noise.

As a vibration/noise reducing technique for a cylindrical roller bearing, for example, as shown in Japanese Utility Model Unexamined Publication No. Hei. 3-67718, there is known a technique in which a roller guide system is used as a system for guiding a cage so that the weight of the cage is loaded on rollers which are existed within unloading-zone (hereinafter refering unloading-zone rollers). The load of the weight of the cage is set against centrifugal force acting on rolling rollers so that the pressure of contact of rollers with an outer race is reduced. As a result, the motion of the unloading-zone rollers is restricted so that reduction of vibration/noise of the bearing is attained.

Figure 7:
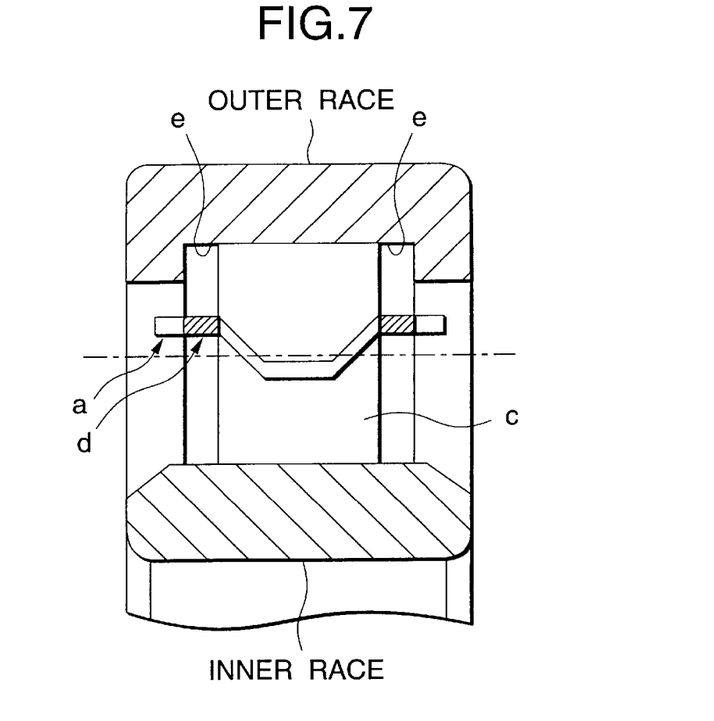
FIG. 7 is an explanatory sectional view for explaining a conventional cylindrical roller bearing.

In a pressed cage for low vibration and low noise, generally, a roller guide surface d of a cage a is formed so as to be opposite to a crowning portion e of a roller rolling surface as shown in FIG. 7.

Figure 8:
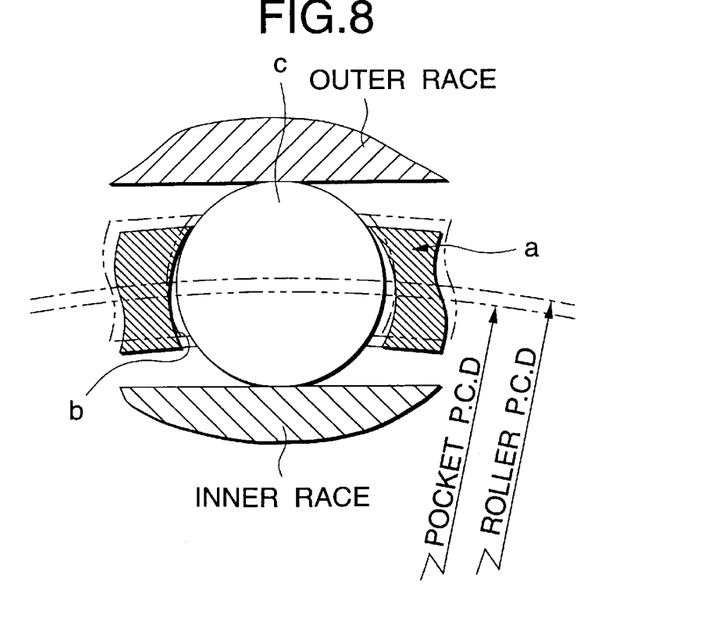
FIG. 8 is an explanatory view for explaining the conventional cylindrical roller bearing.

In the bearing vibration/noise reducing technique disclosed in Japanese Utility Model Unexamined Publication No. Hei. 3-67718, however, as shown in FIG. 8, the pitch circle diameter of pocket holes b of a cage a was set to be smaller than the pitch circle diameter of rollers c. Accordingly, if the bearing was produced with an improper difference between the pitch circle diameters, the restriction in the unloading zone by the cage a became intense. As a result, the rollers c interfered with the cage a superfluously. There was a disadvantage that impact noise (cage noise) was produced due to collision of the rollers c with the cage a.

Further, when the restriction by the cage a was intense, the bearing was apt to be affected by error in production of individual cages. Accordingly, vibration and noise levels of the bearing often scattered. Furthermore, since the guide system was limited to a roller guide system, the specification of the bearing was limited necessarily.

Further, since the roller guide surfaces d of the cage a were formed in portions, respectively, opposite to the crowning portions e on the roller rolling surface as shown in FIG. 7, rollers in the unloading zone in which the roller motion was limited by being guided by the cage a were made unstable by the crowning portions so that skew, or the like, occurred easily. As a result, there was a disadvantage that vibration/noise was produced in the bearing inclusive of the cage.

Note that an occurrence of this disadvantage is not limited by a type of guiding system of cage. This disadvantage is generated in a bearing having a cage of a race guiding system, as well.

The present invention is designed to solve the aforementioned disadvantages and an object of the present invention is to provide a cylindrical roller bearing in which not only squeaking noise caused by rubbing of rollers against inner and outer race surfaces in the unloading zone, cage noise caused by collision of rollers with the cage and vibration/noise of the bearing, inclusive of the cage, caused by occurrence of skew, or the like, can be prevented well but also variations in vibration and noise levels of individual bearings can be suppressed.

SUMMARY OF THE INVENTION

In order to achieve above object, according to the present invention, there is provided a cylindrical roller bearing satisfying following relationships $$1.5 \times 10^{-3} D \leq H \leq 9.0 \times 10^{-3} D$$

and $$A/B = 0.6 \sim 1.0$$

where D is a diameter of a cage circumferential surface which is either one of inner and outer circumferential surfaces of an axial end portion of a cage, H is a size of an annular clearance between the cage circumferential surface and a race circumferential surface which is either one of an outer race rib inner-diameter surface and an inner race rib outer-diameter surface opposite to the cage circumferential surface, A is an axial length of the cage circumferential surface and B is an axial length of the race circumferential surface, wherein a roller guide surface of the cage is provided in a portion opposite to a linear-form portion at least except crowning portions in an axial direction of a roller rolling surface.

In the above-mentioned bearing, it is preferable that the bearing uses as a system for guiding the cage a roller guide system in which a radial displacement of the cage is limited by engagement between each pocket and a corresponding roller, or the bearing uses as a system for guiding the cage a race guide system in which a radial displacement of the cage is limited by the race.

In the present invention, first, the motion of the rollers existing in the unloading zone is suppressed through the cage by the damping force of a lubricant in the annular clearance between the cage circumferential surface and the race circumferential surface so that squeaking noise caused by rubbing of rollers against inner and outer race surfaces is suppressed, the sound pressure level of the cage caused by collision of rollers with the cage is reduced, and variations in vibration and noise levels of individual bearings are suppressed.

That is, the size H of the annular clearance between the cage circumferential surface and the race circumferential surface is restricted to be in the range of $1.5 \times 10^{-3} D \leq H \leq 9.0 \times 10^{-3} D$ as the relation to the diameter D of the cage circumferential surface and the ratio of the axial length A of the cage circumferential surface to the axial length B of the race circumferential surface is set to be in a range of from 0.6 to 1.0. Accordingly, the resistance against a flow of the lubricant to pass through the aforementioned clearance becomes sufficiently intense so that the cage can be hardly displaced.

As a result, there is no displacement of the cage in accordance with the motion of rollers even in the case where an irregular motion (revolution of rollers around their common axis without regular rotation of rollers on their own axes and radial displacement of rollers) occurs in rollers existing in the unloading zone.

Further, the cage is controlled by the roller guide system in which the radial displacement of the cage is limited by engagement between pockets and rollers. There is a lubricant such as grease, or the like, between the pockets and the rollers. Since the motion of the cage and the motion of the rollers restrict each other, the motion of the plurality of rollers held by the cage is restricted when the clearance size H is limited to restrict the motion of the cage. As a result, not only the production of the aforementioned squeaking noise can be suppressed but also the sound pressure level of cage noise can be reduced. Furthermore, variations in vibration and noise levels of individual bearings can be suppressed.

Note that, even if the roller guide system of the bearing in which the radial displacement of the cage is limited by engagement between pockets and rollers is changed to a race guide system in which a radial displacement of the cage is limited by the race, the motion of the rollers held by the cage and the motion of the cage can be controlled as well, to thereby enjoy the same effects described above. In this case, a relationship between the peripheral surface of the cage and the peripheral surface of the race meets a geometrical and positional relationship.

If the clearance size H is smaller than $1.5 \times 10^{-3} D$, a sufficient amount of the lubricant can be hardly interposed in this clearance. This causes abnormal abrasion or abnormal temperature rising. If the clearance size H is larger than $9.0 \times 10^{-3} D$, the resistance against a flow of the lubricant to pass through the clearance is reduced. As a result, neither the effect of preventing the production of squeaking noise and cage noise nor the effect of suppressing variations in vibration and noise levels of individual bearings can be obtained sufficiently. Incidentally, when heating at the time of operating the bearing, or the like, is taken into account, the clearance size H is preferably limited to be in the range of $4.5 \times 10^{-3} D \leq H \leq 7.5 \times 10^{-3} D$.

If A/B is lower than 0.6, the resistance against a flow of the lubricant to pass through the clearance is reduced. As a result, neither the effect of preventing the production of squeaking noise and cage noise nor the effect of suppressing variations in vibration and noise levels of individual bearings can be obtained sufficiently. If A/B is higher than 1.0, the cage protrudes from an axial end surface of the outer or inner race and interferes with other members. This is undesirable in terms of the design of the bearing.

Further, in the present invention, a roller guide surface of the cage is provided in at least a portion opposite to a linear form portion except crowning portions on the axial direction of the roller rolling surface as well as the aforementioned relations of $1.5 \times 10^{-3} D \leq H \leq 9.0 \times 10^{-3} D$ and $A/B=0.6-1.0$ are satisfied. Accordingly, even in the unloading zone in which the roller motion is guided by the cage so as to be restricted, the rollers are hardly made unstable so that the occurrence of skew, or the like, can be suppressed compared with the case where the rollers are guided by portions opposite to the crowning portions. As a result, vibration/noise of the bearing can be suppressed.

In addition, the above-mentioned object can also be achieved by a cylindrical roller bearing according to the present invention comprising:

an inner race;

an outer race having ribs at both ends in an axial direction of the roller bearing and having a roller rolling surface between the ribs, the roller rolling surface including crowning portions and a liner-from portion interposed between the crowning portions;

a plurality of cylindrical rollers disposed between the inner race and the outer race; and a cage disposed between the inner race and the outer race and provided with pocket portions in which the plurality of cylindrical rollers are respectively accommodated, the cage having a roller guide surface which is provided in a portion opposite to the linear-form portion at least except crowning portions in an axial direction of the roller rolling surface, wherein the cylindrical roller bearing satisfies a following relations $$1.5 \times 10^{-3} D \leq H \leq 9.0 \times 10^{-3} D$$

and $$A/B=0.6-1.0$$

where

D is a diameter of an outer circumferential surface of an axial end portion of the cage, H is a size of an annular clearance between the outer circumferential surface of the cage and an outer race rib inner-diameter surface of the rib which is opposite to the outer circumferential surface of the cage, A is an axial length of the outer circumferential surface of the cage and B is an axial length of the outer race rib inner-diameter surface.

Further, the above-mentioned object can also be achieved by a cylindrical roller bearing according to the present invention comprising:

an outer race;

an inner race having ribs at both ends in an axial direction of the roller bearing and having a roller rolling surface between the ribs, the roller rolling surface including crowning portions and a liner-from portion interposed between the crowning portions;

a plurality of cylindrical rollers disposed between the inner race and the outer race; and a cage disposed between the inner race and the outer race and provided with pocket portions in which the plurality of cylindrical rollers are respectively accommodated, the cage having a roller guide surface which is provided in a portion opposite to the linear-form portion at least except crowning portions in an axial direction of the roller rolling surface, wherein the cylindrical roller bearing satisfies a following relations $$1.5 \times 10^{-3} D \leq H \leq 9.0 \times 10^{-3} D$$

and $$A/B=0.6 \sim 1.0$$

where

D is a diameter of an inner circumferential surface of an axial end portion of the cage, H is a size of an annular clearance between the inner circumferential surface of the cage and an inner race rib outer-diameter surface of the rib which is opposite to the inner circumferential surface of the cage, A is an axial length of the inner circumferential surface of the cage and B is an axial length of the inner race rib outer-diameter surface.

In the above-mentioned cylindrical roller bearing according to the invention, it is preferable that the clearance size H satisfies a following equation, $4.5 \times 10^{-3} D \leq H \leq 7.5 \times 10^{-3} D$.

DETAILED DESCRIPTION OF THE PREFERRED EMBODIMENTS

Preferred Embodiments of the present invention will be described below with reference to the drawings.

Figure 1:
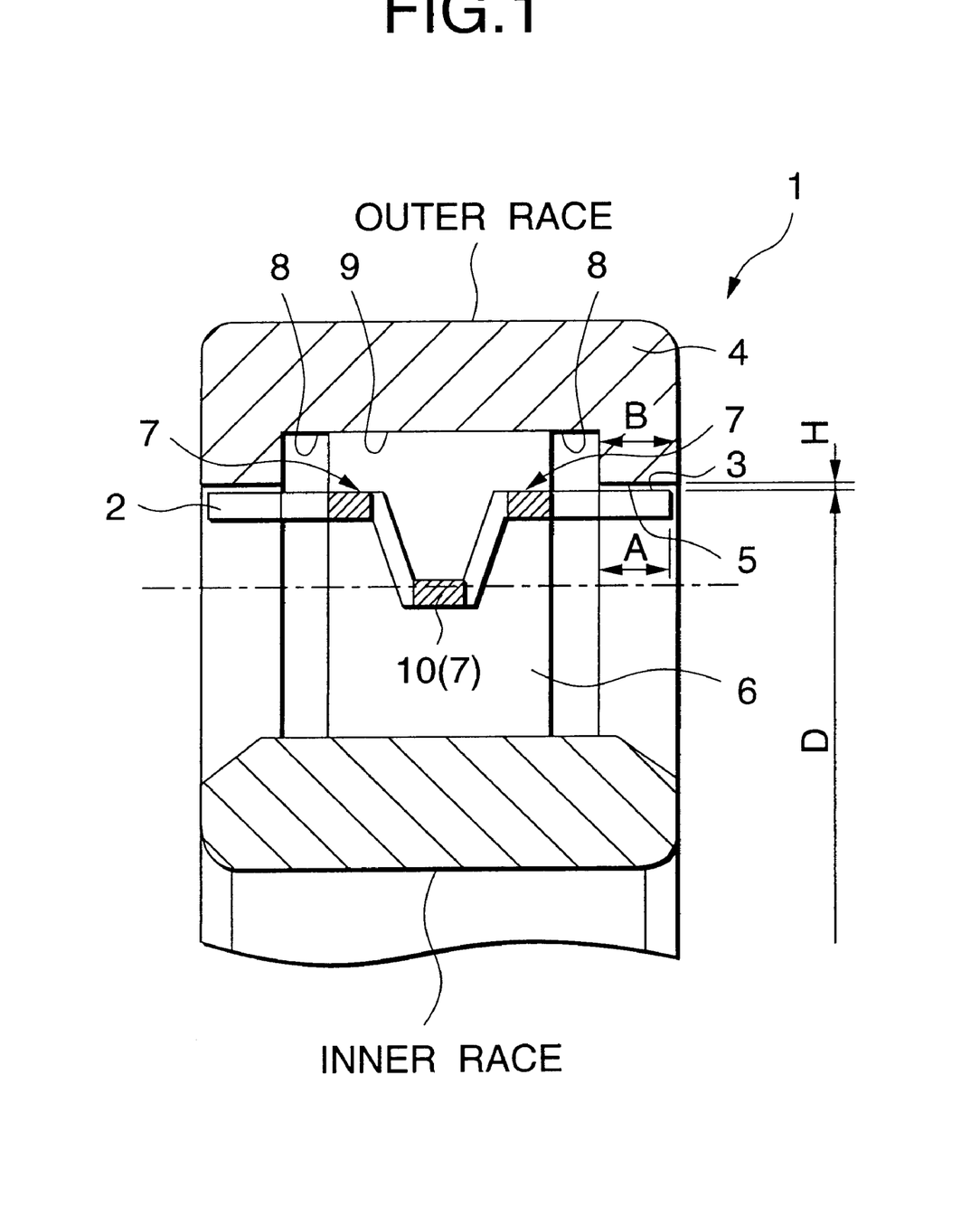
FIG. 1 is an explanatory sectional view for explaining a cylindrical roller bearing as an embodiment of the present invention.
Figure 2:
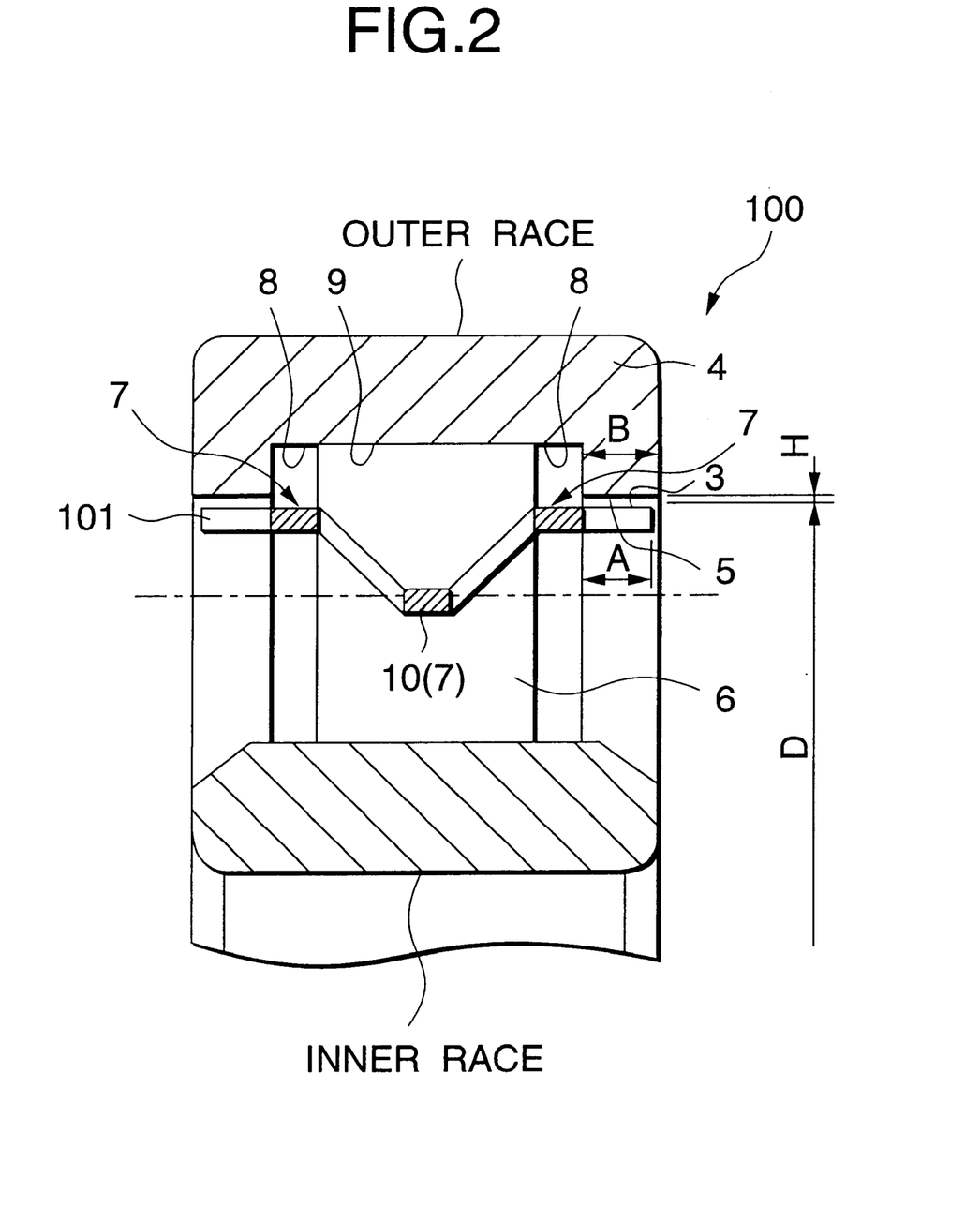
FIG. 2 is an explanatory sectional view for explaining a cylindrical roller bearing as a comparative example.
Figure 3:
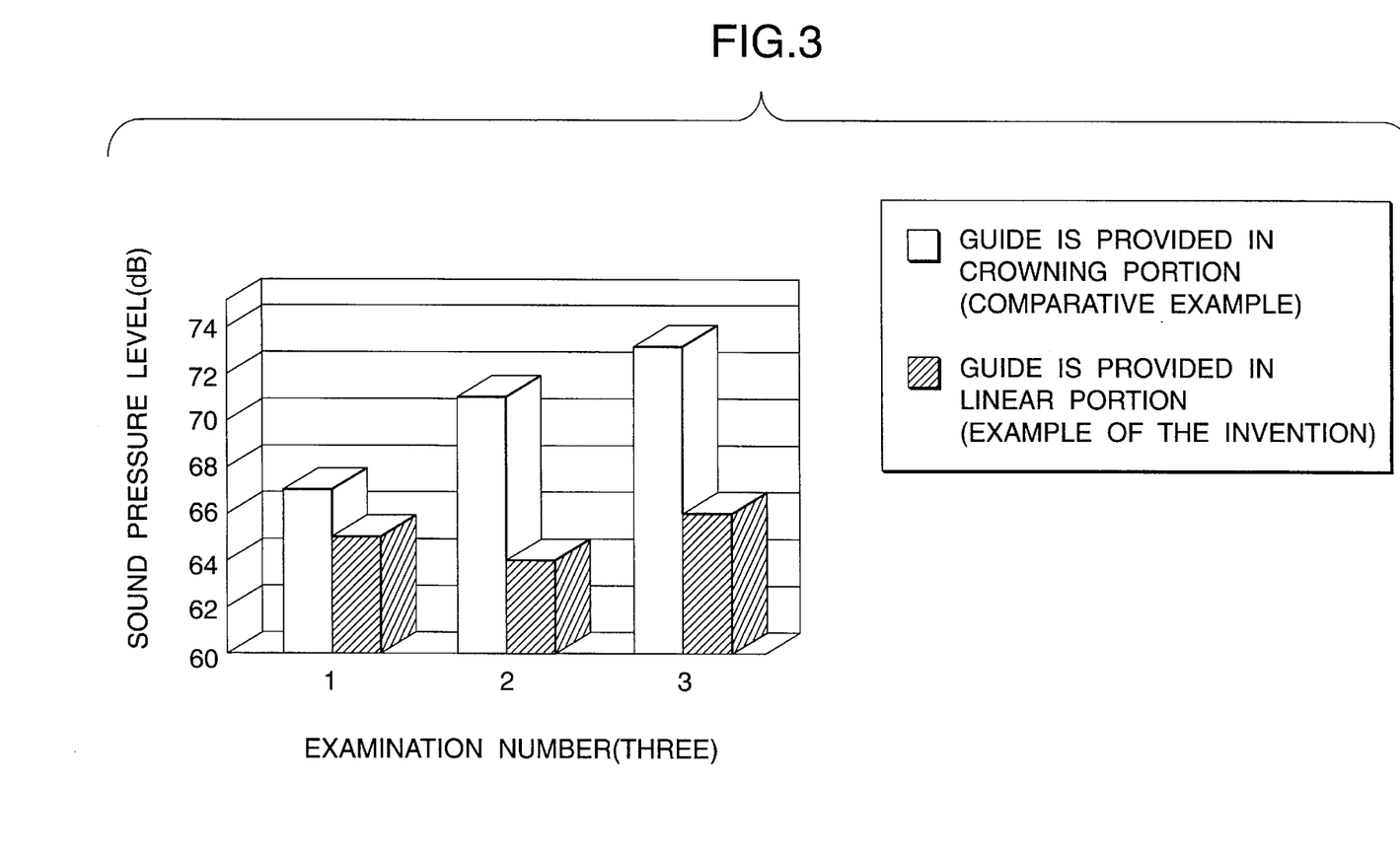
FIG. 3 is a graph showing a result of a rotation acoustic evaluation test.
Figure 4:
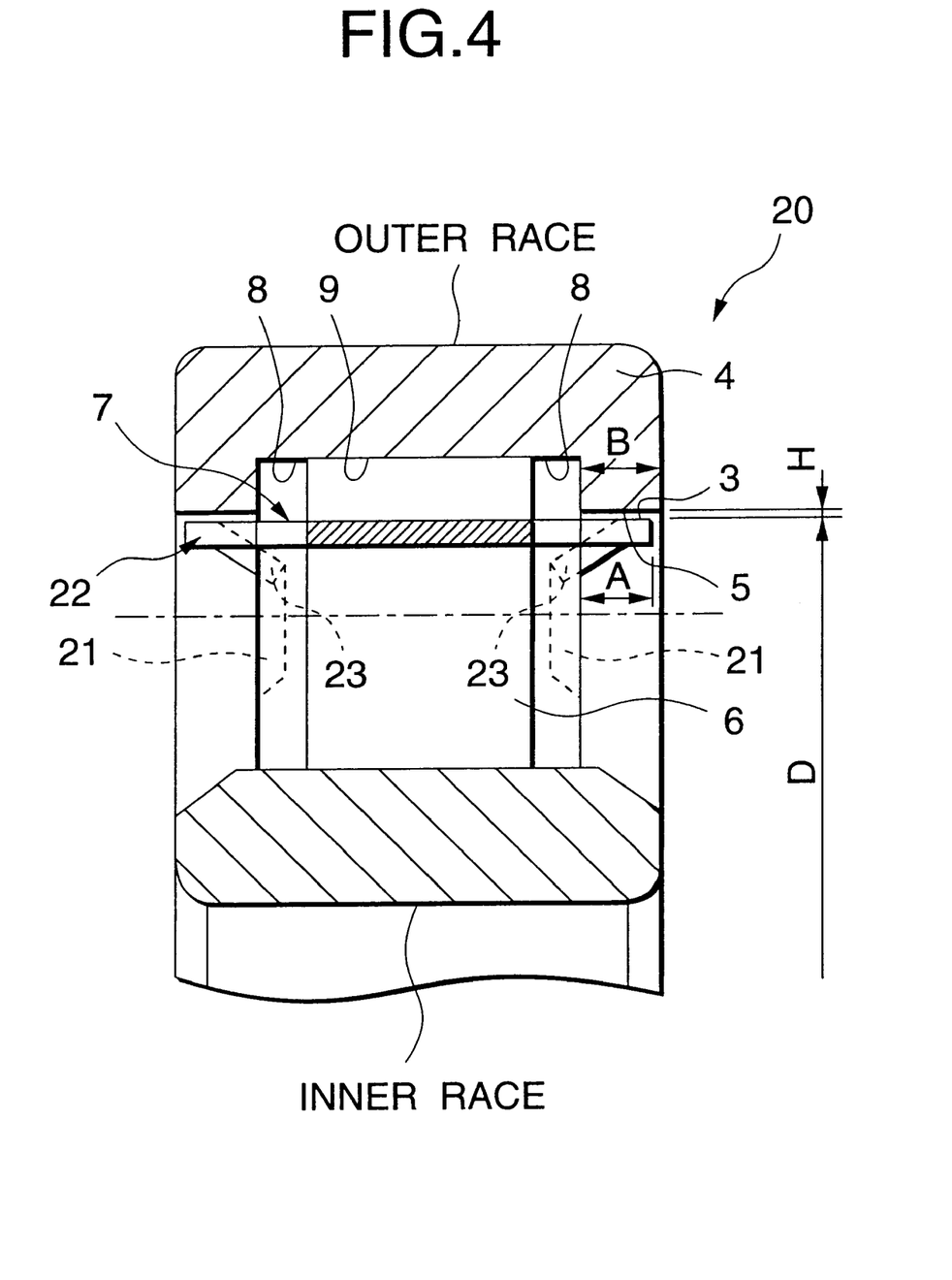
FIG. 4 is an explanatory sectional view for explaining a cylindrical roller bearing as another embodiment of the present invention.
Figure 5:
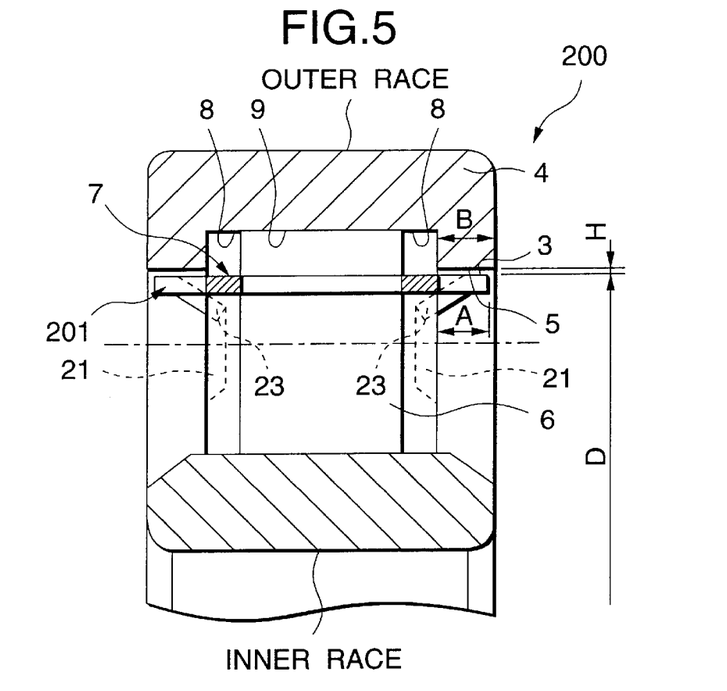
FIG. 5 is an explanatory sectional view for explaining the cylindrical roller bearing as a comparative example in the other embodiment.
Figure 6:
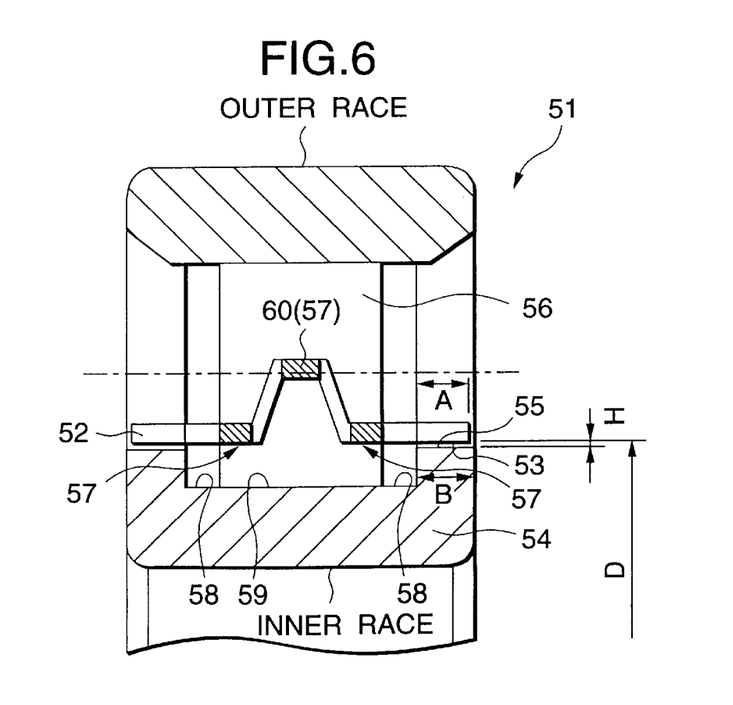
FIG. 6 is an explanatory sectional view for explaining a cylindrical roller bearing as a further embodiment of the present invention.

FIG. 1 is an explanatory sectional view for explaining a cylindrical roller bearing as an embodiment of the present invention. FIG. 2 is an explanatory sectional view for explaining a cylindrical roller bearing as a comparative example. FIG. 3 is a graph showing a result of a rotation acoustic evaluation test. FIG. 4 is an explanatory sectional view for explaining a cylindrical roller bearing as another embodiment of the present invention. FIG. 5 is an explanatory sectional view for explaining the cylindrical roller bearing as the comparative example in comparison with the other embodiment. FIG. 6 is an explanatory sectional view for explaining a cylindrical roller bearing as a further embodiment of the present invention.

Referring first to FIG. 1, the cylindrical roller bearing 1 is an NU308 type cylindrical roller bearing which satisfies the relations $H=5.0\times10^{-3}D$ and $A/B=0.9$ when D is the diameter of a cage circumferential surface 3 which is an outer circumferential surface of an axial end portion of a pressed cage 2, H is the size of an annular clearance existing between the cage circumferential surface 3 and a race circumferential surface 5 which is an inner-diameter circumferential surface of an outer race rib 4 opposite to the cage circumferential surface 3, A is the axial length of the cage circumferential surface 3 and B is the axial length of the race circumferential surface 5. In the cylindrical roller bearing 1, as a system for guiding the cage 2, a roller guide system in which the radial displacement of the cage 2 is limited by the engagement between each pocket and a corresponding roller 6 is used. Further, a roller guide surface 7 of the cage 2 is provided in a portion opposite to a linear form portion 9 except crowning portions 8 on the axial direction of a roller rolling surface.

Further, a roller dropping preventing portion 10 is provided in an inner-diameter portion of a substantially axial center portion of the cage 2 to thereby prevent the roller from dropping (decomposing). In this embodiment, the aforementioned guide surface 7 is provided also in the roller dropping preventing portion 10. As for the shape of the roller rolling surface, there is used the roller rolling surface in which a linear form portion 9 which is 70% of the roller length is left in the lengthwise center portion of the roller 6 so that crowning portions 8 are applied to opposite ends, respectively, of the linear form portion 9.

By satisfying the relations $H=5.0\times10^{-3}D$ and $A/B=0.9$, the resistance against a flow of the lubricant to pass through the annular clearance existing between the race circumferential surface 5 and the cage circumferential surface 3 is made sufficiently large to limit the motion of the cage 2 to thereby limit the motion of the plurality of rollers 6 because there is a relation that the motion of the cage 2 and the motion of the rollers 6 limit each other. As a result, not only squeaking noise caused by rubbing of the rollers against the inner and outer race surfaces in the unloading zone is prevented but also the sound pressure level of cage noise caused by collision of the rollers with the cage is reduced.

Furthermore, variations in vibration and noise levels of individual bearings are suppressed.

Further, by providing the roller guide surfaces 7 of the cage 2 in portions opposite to the linear form portion 9 except the crowning portions 8 on the axial direction of the roller rolling surface, the rollers 6 are hardly made unstable even in the unloading zone in which the roller motion is limited by being guided by the cage 2, as compared with the case where the rollers 6 are guided by portions opposite to the crowning portions 8. Accordingly, skew, or the like, is suppressed from occurring. Accordingly, vibration/noise of the bearing, inclusive of the cage, due to the skew, or the like, is prevented from occurring.

As a result, the operation and effect obtained by the relations $H=5.0\times10^{-3}D$ and $A/B=0.9$ and the operation and effect obtained by provision of the roller guide surfaces 7 of the cage 2 in a portion opposite to the linear form portion 9 except the crowning portions 8 on the axial direction of the roller rolling surface cooperate together so that vibration/noise of the bearing can be prevented well.

A rotation acoustic evaluation test for confirming the operation and effect of the present invention will be described below.

The cylindrical roller bearing shown in FIG. 2 is an NU308 type cylindrical roller bearing 100 which is used as a comparative example and which is the same as the cylindrical roller bearing 1 shown in FIG. 1 except that roller guide surfaces 7 of a pressed cage 101 are provided in portions opposite to the crowning portions 8, respectively, of a roller rolling surface. The main size of each of the cylindrical roller bearing 1 and 100 was set as follows: an outer diameter of the outer race was 90 mm; a width in the axial direction thereof was 23 mm; an inner diameter of the inner race was 40 mm; a roller diameter was 12 mm; and a roller length L was 12 mm.

Three samples of each of the cylindrical roller bearings 1 and 100 (six samples in total) were prepared for the acoustic evaluation test. Noise produced when each of the cylindrical roller bearings 1 and 100 revolved twice (twelve times in total) was collected by a microphone and evaluated as a sound pressure level value by a frequency analyzer (FFT).

Conditions for the test were as follows.

Test Conditions rotational speed: 1200 rpm lubricant: oil (ISO VG68)

radial load: 40 kgf measurement frequency range: 0 to 10 KHz

FIG. 3 shows a result of this experiment. The horizontal axis expresses an examination number on the two kinds of cylindrical roller bearings 1 and 100 and the vertical axis expresses an average sound pressure level in twice measurements.

As is obvious from FIG. 3, it is found that an effect enough to prevent vibration/noise is not obtained in the cylindrical roller bearing 100 as a comparative example in which the roller guide surfaces 7 of the cage 101 are provided in portions opposite to the crowning portions 8, respectively, on the axial direction of the roller rolling surface, because the average sound pressure level is in a high range or from 67 to 73 dB and varies by about 6 dB.

This is considered as follows. In the unloading zone in which the roller motion is limited by being guided by the cage 101, rollers are not evenly guided by the cage 101 because of the crowning portions. Further, the thickness of a lubricating oil film is apt to be uneven particularly in the crowning portions 8. Accordingly, torque difference occurs between axially opposite end portions of the roller rolling surface. Accordingly, the rollers are made unstable easily, so that skew, or the like, occurs. As a result, vibration/noise of the bearing is produced so that the sound pressure level of the bearing is not reduced.

On the contrary, it is found that an effect enough to prevent vibration/noise is obtained in the cylindrical roller bearing 1 as an embodiment of the present invention in which the roller guide surfaces 7 of the cage 2 are provided in portions, respectively, opposite to the linear form portion 9 except the crowning portions 8 on the axial direction of the roller rolling surface, because the average sound pressure level of the cylindrical roller bearing 1 is in a range of from 64 to 66 dB which is lower by about 3 dB than that of the cylindrical roller bearing 100 which is a comparative example and varies by about 2 dB.

This is considered as follows. Since skew, or the like, With respect to the direction of revolution of rollers guided by the cage 2 in the unloading zone can be suppressed, the rollers can revolve around their common axis with their stable attitudes while rotating on their own axes respectively. As a result, the sound pressure level of the bearing is reduced.

It could be confirmed from the above description that an effect enough to prevent vibration/noise was obtained by provision of the roller guide surfaces 7 of the cage 2 in portions, respectively, opposite to the linear form portion 9 except the crowning portions 8 on the axial direction of the roller rolling surface.

Further, though not shown, the cylindrical roller bearing 1 as an embodiment of the present invention was compared with a cylindrical roller bearing incorporated with a conventional pressed cage as a comparative example in which values of H and A/B do not satisfy the aforementioned relations $1.5 \times 10^{-3}D \leq H \leq 9.0 \times 10^{-3}D$ and A/B=0.6–1.0. It was confirmed that there was obtained an effect of reducing the average sound pressure level of the cylindrical roller bearing 1 according to the embodiment of the present invention by about 3 dB compared with the comparative example.

A cylindrical roller bearing as another embodiment of the present invention will be described below with reference to FIG. 4.

The cylindrical roller bearing 20 is an NU308 type cylindrical roller bearing which is the same as the cylindrical roller bearing 1 shown in FIG. 1 except the following points. The cylindrical roller bearing 1 is configured so that roller dropping preventing portion 10 is provided in an inner-diameter portion of the substantially axial center portion of the cage 2 to thereby prevent the roller from dropping (decomposing), whereas the cylindrical roller bearing 20 is configured so that escape portions 21 are provided in end surface portions of the rollers 6 and roller dropping preventing projections 23 provided in a pressed cage 22 are inserted in the escape portions 21 and that the roller guide surface 7 of the cage 22 is substantially provided in the whole region of a portion opposite to the linear form portion 9 except the crowning portions 8 on the axial direction of the roller rolling surf ace. Other configuration, operation and effect of the cylindrical roller bearing 20 are the same as those of the cylindrical roller bearing 1. In FIG. 4, parts the same as those in FIG. 1 are referenced correspondingly so that the duplicated description will be omitted.

FIG. 5 shows an NU308 type cylindrical roller bearing 200 used as an example to be compared with the cylindrical roller bearing 20. The cylindrical roller bearing 200 is the same as the cylindrical roller bearing 20 except that roller guide surfaces 7 of a pressed cage 201 are provided in portions, respectively, opposite to the crowning portions 8 of the roller rolling surface.

There were prepared four samples of each of the cylindrical roller bearings 20 and 200 (eight samples in total) having main size as follows: an outer diameter of the outer race was 90 mm; a width in the axial direction was 23 mm; an inner diameter of the inner race was 40 mm; a roller diameter was 12 mm; and a roller length L was 12 mm. The rotation acoustic evaluation test was carried out twice (sixteen times in total) on the cylindrical roller bearings 20 and 200 in the aforementioned manner. As a result, it was confirmed that an effect of reducing the average sound pressure level by a value of from about 2 dB to about 3 dB was obtained in the cylindrical roller bearing 20 as an embodiment of the present invention in which the roller guide surface 7 of the cage 22 is provided in the whole region of a portion opposite to the linear form portion 9 except the crowning portions 8 on the axial direction of the roller rolling surface compared with the cylindrical roller bearing 200 as a comparative example in which the roller guide surfaces 7 of the pressed cage 201 are provided in portions, respectively, opposite to the crowning portions 8 of the roller rolling surface.

Conditions for the test were as follows.

Test Conditions rotational speed: 1200 rpm lubricant: oil (ISO VG68)

radial load: 40 kgf measurement frequency range: 0 to 10 KHz

Moreover, a cylindrical roller bearing as a further embodiment of the present invention will be described below with reference to FIG. 6.

Referring to FIG. 6, the cylindrical roller bearing 51 is an N308 type cylindrical roller bearing which satisfies the relations $H=5.0 \times 10^{-3}D$ and A/B=0.9 when D is the diameter of a cage circumferential surface 53 which is an inner circumferential surface of an axial end portion of a pressed cage 52, H is the size of an annular clearance existing between the cage circumferential surface 53 and a race circumferential surface 55 which is an outer-diameter circumferential surface of an inner race rib 54 opposite to the cage circumferential surface 53, A is the axial length of the cage circumferential surface 53 and B is the axial length of the race circumferential surface 55. In the cylindrical roller bearing 51, as a system for guiding the cage 52, a roller guide system in which the radial displacement of the cage 52 is limited by the engagement between each pocket and a corresponding roller 56 is used. Further, a roller guide surface 57 of the cage 52 is provided in a portion opposite to a linear form portion 59 except crowning portions 58 on the axial direction of a roller rolling surface.

Further, a roller dropping preventing portion 60 is provided in an inner-diameter portion of a substantially axial center portion of the cage 52 to thereby prevent the roller from dropping (decomposing). In this embodiment, the aforementioned guide surface 57 is provided also in the roller dropping preventing portion 60. As for the shape of the roller rolling surface, there is used the roller rolling surface in which a linear form portion 59 which is 70% of the roller length is left in the lengthwise center portion of the roller 56 so that crowning portions 58 are applied to opposite ends, respectively, of the linear form portion 59.

By satisfying the relations $H=5.0 \times 10^{-3}D$ and A/B=0.9, the resistance against a flow of the lubricant to pass through the annular clearance existing between the race circumferential surface 55 and the cage circumferential surface 53 is made sufficiently large to limit the motion of the cage 52 to thereby limit the motion of the plurality of rollers 56 because there is a relation that the motion of the cage 2 and the motion of the rollers 56 limit each other. As a result, not only squeaking noise caused by rubbing of the rollers against the inner and outer race surfaces in the unloading zone is prevented but also the sound pressure level of cage noise caused by collision of the rollers with the cage is reduced. Furthermore, variations in vibration and noise levels of individual bearings are suppressed.

Further, by providing the roller guide surfaces 57 of the cage 52 in portions opposite to the linear form portion 59 except the crowning portions 58 on the axial direction of the roller rolling surface, the rollers 56 are hardly made unstable even in the unloading zone in which the roller motion is limited by being guided by the cage 52, as compared with the case where the rollers 56 are guided by portions opposite to the crowning portions 58. Accordingly, skew, or the like, is suppressed from occurring. Accordingly, vibration/noise of the bearing, inclusive of the cage, due to the skew, or the like, is prevented from occurring.

As a result, the operation and effect obtained by the relations $H=5.0\times10^{-3}D$ and $A/B=0.9$ and the operation and effect obtained by provision of the roller guide surfaces 57 of the cage 52 in a portion opposite to the linear form portion 59 except the crowning portions 58 on the axial direction of the roller rolling surface cooperate together so that vibration/noise of the bearing can be prevented well.

Although the aforementioned embodiments have shown the case where a pressed cage is used, it is a matter of course that the pressed cage maybe replaced by a plastic cage, a brass drilled cage, or the like, that the material and shape of the cage and the form of the cage as to whether the cage is of an integral type or of a separate type are not limited specifically and that the effect for low vibration and low noise is obtained without departing the spirit of the present invention.

Note that, even if the roller guide system of the above-mentioned embodiment in which the radial displacement of the cage is limited by engagement between pockets and rollers is changed to a race guide system in which a radial displacement of the cage is limited by the race, the motion of the rollers held by the cage and the motion of the cage can be controlled as well, to thereby enjoy the same effects described above. The same effects can be obtained, not only in a race guide system in which a radial displacement of the cage is limited by the inner peripheral surface of the ribs of the outer race, but also in a race guide system in which a radial, displacement of the cage is limited by the outer peripheral surface of the ribs of the inner race.

As is obvious from the above description, according to the present invention, there is obtained an effect that not only squeaking noise caused by rubbing of rollers with inner and outer race surfaces in the unloading zone, cage noise caused by collision of rollers with the cage and vibration/noise of the bearing, inclusive of the cage, caused by skew, or the like, can be prevented well but also variations in vibration and noise levels of individual bearings can be suppressed.

The present invention is based on Japanese Patent Application No. Hei. 10-195890, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A cylindrical roller bearing comprising:

an inner race;

an outer race;

a plurality of cylindrical rollers disposed between said inner race and said outer race; and a cage disposed between said inner race and said outer race and provided with pocket portions in which said plurality of cylindrical rollers are respectively accommodated, wherein said cylindrical roller bearing satisfies a following relations $$1.5\times10^{-3}D \leq H \leq 9.0\times10^{-3}D$$

and $$A/B=0.6\sim1.0$$

where

D is a diameter of a cage circumferential surface of said cage which is either one of inner and outer circumferential surfaces of an axial end portion of said cage, H is a size of an annular clearance between said cage circumferential surface and a race circumferential surface which is either one of an outer race rib inner-diameter surface and an inner race rib outer-diameter surface opposite to said cage circumferential surface, A is an axial length of said cage circumferential surface and B is an axial length of said race circumferential surface, wherein a roller guide surface of said cage is provided in a portion opposite to a linear-form portion at least except crowning portions in an axial direction of a roller rolling surface.

2. The cylindrical roller bearing according to claim 1, wherein said bearing uses a roller guide system in which radial displacement of said cage is limited by engagement between each pocket and a corresponding roller.

3. The cylindrical roller bearing according to claim 1, wherein said clearance size H satisfies a following equation $$4.5\times10^{-3}D \leq H \leq 7.5\times10^{-3}D.$$

4. A cylindrical roller bearing comprising:

an inner race;

an outer race having ribs at both ends in an axial direction of said roller bearing and having a roller rolling surface between said ribs, said roller rolling surface including crowning portions and a linear-from portion interposed between said crowning portions;

a plurality of cylindrical rollers disposed between said inner race and said outer race; and a cage disposed between said inner race and said outer race and provided with pocket portions in which said plurality of cylindrical rollers are respectively accommodated, said cage having a roller guide surface which is provided in a portion opposite to said linear-form portion at least except crowning portions in an axial direction of said roller rolling surface, wherein said cylindrical roller bearing satisfies a following relations $$1.5\times10^{-3}D \leq H \leq 9.0\times10^{-3}D$$

and $$A/B=0.6-1.0$$

where

D is a diameter of an outer circumferential surface of an axial end portion of said cage, H is a size of an annular clearance between said outer circumferential surface of said cage and an outer race rib inner-diameter surface of said rib which is opposite to said outer circumferential surface of said cage, A is an axial length of said outer circumferential surface of said cage and B is an axial length of said outer race rib inner-diameter surface.

5. The cylindrical roller bearing according to claim 4, wherein said clearance size H satisfies a following equation $$4.5 \times 10^{-3} D \leq H \leq 7.5 \times 10^{-3} D.$$

6. A cylindrical roller bearing comprising:

an outer race;

an inner race having ribs at both ends in an axial direction of said roller bearing and having a roller rolling surface between said ribs, said roller rolling surface including crowning portions and a liner-from portion interposed between said crowning portions;

a plurality of cylindrical rollers disposed between said inner race and said outer race; and a cage disposed between said inner race and said outer race and provided with pocket portions in which said plurality of cylindrical rollers are respectively accommodated, said cage having a roller guide surface which is provided in a portion opposite to said linear-form portion at least except crowning portions in an axial direction of said roller rolling surface, wherein said cylindrical roller bearing satisfies a following relations $$1.5 \times 10^{-3} D \leq H \leq 9.0 \times 10^{-3} D$$

and $$A/D=0.6-1.0$$

where

D is a diameter of an inner circumferential surface of an axial end portion of said cage, H is a size of an annular clearance between said inner circumferential surface of said cage and an inner race rib outer-diameter surface of said rib which is opposite to said inner circumferential surface of said cage, A is an axial length of said inner circumferential surface of said cage and B is an axial length of said inner race rib outer-diameter surface.

7. The cylindrical roller bearing according to claim 6, wherein said clearance size H satisfies a following equation $$4.5 \times 10^{-3} D \leq H \leq 7.5 \times 10^{-3} D.$$

* * * * *